April 20, 1937.  F. H. SHEPARD, JR  2,077,592
CAPACITY BALANCE CIRCUIT
Filed Feb. 1, 1935

INVENTOR.
FRANCIS H. SHEPARD JR.

BY

ATTORNEY.

Patented Apr. 20, 1937

2,077,592

UNITED STATES PATENT OFFICE 2,077,592

CAPACITY BALANCE CIRCUIT

Francis H. Shepard, Jr., Rutherford, N. J., assignor to Radio Corporation of America, a corporation of Delaware Application February 1, 1935, Serial No. 4,470

1 Claim. (Cl. 250—27)

The present invention relates to a capacity divider circuit and amplifier and more particularly to a capacity operated relay or power device in which a capacity divider is arranged to supply alternating current to the grid of a thermionic amplifier in such a way that the alternating current potential is in phase or 180° out of phase with the alternating current potential supplied to the anode of the thermionic amplifier.

It is an object of the present invention to devise a capacity operated relay or power device in which a capacity divider and an alternating current operated direct current amplifier are connected to a common alternating current power supply in such a manner that variations of the alternating current output of the capacity divider due to the condition of adjustment of the capacity divider is applied to the grid of the amplifier in such a manner as to cause the direct current output of the amplifier to rise or fall with the condition of the capacity ratio.

In many cases, as for instance, burglar alarms and temperature control devices it is very desirable to have an arrangement which will efficiently amplify small capacity changes.

The present invention may be broadly stated to comprise a method and means for operating a capacity bridge circuit on commercially available alternating current in order to detect small changes in capacity and in accordance with these small changes control a considerable amount of power, in, say, the plate circuit of a power tube. In accordance with the present invention it is possible to control, for instance, the temperature of a furnace by means of small changes in the capacity of a small condenser plate placed near the needle of a sensitive temperature indicating meter. This capacity change is utilized to operate an amplifier which may include a power tube, the output of the power tube being operatively associated with a suitable solenoid or similar device to drive a balanced valve used to control the gas fed to the furnace and hence the temperature of the furnace.

It is an object of the present invention to produce a device which is extremely sensitive, simple, stable, positive in operation and low in cost.

Figure 1:
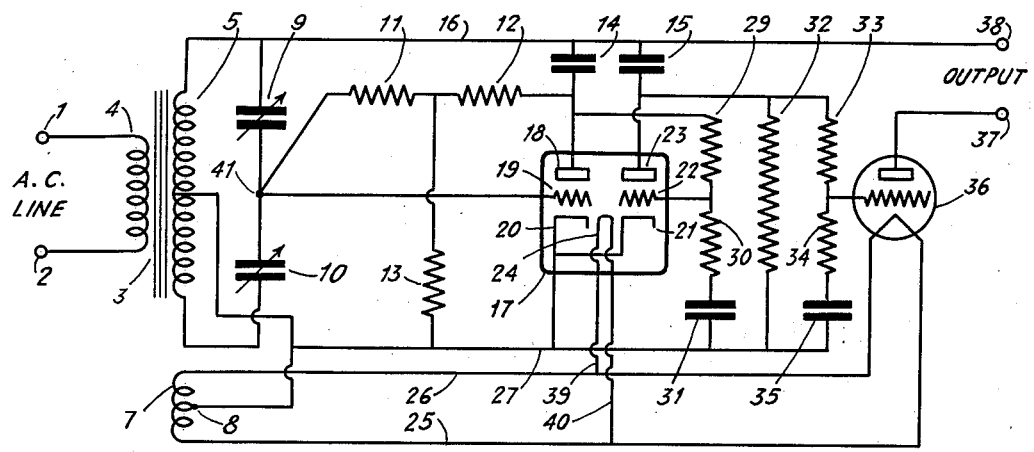
Figure 2:
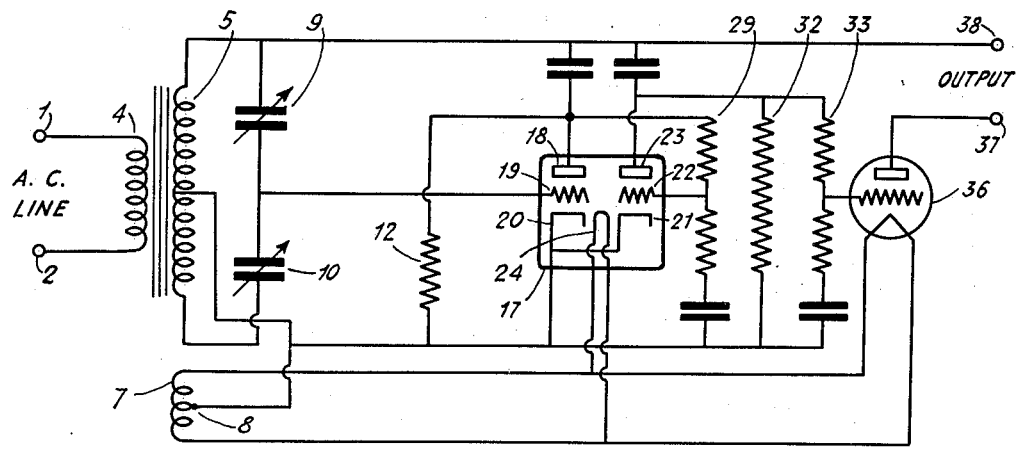

The various broad aspects of the invention are illustrated by the circuit diagrams in the accompanying drawing wherein, Figure 1 is a circuit diagram illustrating a preferred form of the invention showing a capacity bridge circuit in conjunction with an a. c. operated d. c. amplifier; and, Figure 2 is a circuit diagram of a modified form of the invention.

Referring to Figure 1 terminals 1 and 2 of transformer 3 are arranged so as to be connected to a suitable power supply line, as for instance, the usual 120 volt 60 cycle commercially available power lines. The transformer 3 includes a primary 4 and two secondaries 5 and 7. A double triode tube 17 having two plates 18 and 23, two grids 19 and 22 and two indirectly heated cathodes 20 and 21 has its two plates 18 and 23 connected to one end of the secondary 5 through the medium of condensers 14 and 15 respectively and the conductor 16. The cathodes 20 and 21 are preferably connected together and through the medium of a conductor 27 both thereof are connected to the center tap of the secondary 5. Across the secondary 5 there are connected two variable condensers 9 and 10 in series. Point 41 which is common to the two variable condensers 9 and 10 is connected directly to the grid 19 of tube 17 and also through the medium of two resistors 11 and 12 to the anode 18. A connection is provided between a point common to the resistors 11 and 12 and the conductor 27 which connection includes a resistor 13.

Plate 18 is also connected to the conductor 27 by a circuit which includes resistor 29, resistor 30 and a condenser 31 all in series in the order mentioned. A point of the last-named circuit which is intermediate the resistors 29 and 30 is connected to the grid 22 of the tube 17. By means of a resistor 32 the anode 23 is connected to the conductor 27. A connection between anode 23 to the center tap of the secondary 5 includes a resistor 33, a resistor 34, a condenser 35 and conductor 27 all in series.

A tube 36 shown as having an anode, a cathode and a grid may be utilized as an amplifier, the grid of this tube being connected to a point intermediate the resistors 33 and 34 as shown. The anode of tube 36 connects to an output terminal 37, the other output terminal 38 being connected by means of the conductor 16 to the upper portion of the secondary 5.

In order to heat the cathodes 20 and 21 of tube 17 and the cathode of tube 36 there is provided a heating circuit which includes the secondary 7, a heater circuit 24 connected across the secondary 7 through the medium of conductors 39 and 40 and the leads 25 and 26 which feed current from the secondary 7 to the heating circuit for the cathode of tube 36. The mid-point 8 of the secondary 7 is connected to the center tap of secondary 5 which if desired may be grounded.

In Figure 2 it is obvious that the circuit arrangement is similar to that shown in Figure 1 except that the resistor 12 is connected between anode 18 of tube 17 and the center tap of secondary 5 through lead 27, it being noted that resistors 11 and 13 are eliminated.

It is to be understood that either of the variable condensers 9 and 10 may represent the variable element of any sensitive indicating or measuring device such as the capacity of a meter needle to a small condenser plate or element, the capacity between condenser elements mounted on any two objects movable with respect to each other or the capacity between any two fixed condenser elements the capacity between which may be varied by a 3rd element brought near or between the capacity elements. The 3rd element may be conductive or may be of dielectric material.

In operation, variable condenser 9 may be utilized to balance the circuit or bridge. When condensers 9 and 10 are balanced the a. c. potential on the grid 19 is such that the average d. c. drawn by anode 18 has a value which is sufficient to cause the anode 18 to assume a mean d. c. potential by virtue of the I. R. drop in resistors 12 and 13 in the case of Figure 1, and resistor 12 alone in the case of Figure 2, to supply the desired d. c. bias to grid 22. In Figure 1 the d. c. potential of the grid 19 is obtained by connecting to the common connection between resistors 12 and 13 through the filter resistor 11. The potential of this common connection is proportional to the d. c. potential of the anode 18 by the ratio of the value of resistance 13 to the value of resistor 12 plus resistor 13. In this manner the first triode section of tube 17 is self-biased.

In the case of Figure 2, the grid 19 assumes an average d. c. potential which is equal to the peak positive alternating current voltage applied between grid 19 and cathode 20 as determined by the voltage of secondary 5 divided by the fraction which is given by the value of condenser 10 over the value of condenser 9 plus condenser 10. Any excessive grid d. c. potential on the grid 19 will leak off because of the normal currents of the negative grid.

In the above discussions it is to be distinctly understood that in order to simplify the description the effects of the tube capacities have been considered negligible. However, it is appreciated that these tube capacities are not negligible and in fact should be taken into account in designing various commercial apparatus in accordance with the present invention.

Taking the case of temperature control devices, let it be supposed that due to a change in temperature the capacity value of the condenser 10 is reduced. In such a case the grid 19 will swing more positive in phase with the supply voltage applied to the plate 18. This causes the plate current to increase. In case the capacity value of the condenser 10 should increase then the grid 19 will swing less positive than formerly with the result that a reduction of plate current occurs. These changes cause an increasing or decreasing potential on the plate 18. The remaining portion of the circuit including the second section of the tube 17 and the tube 36 comprises an a. c. operated d. c. amplifier such as disclosed in a copending application Serial Number 727,968 filed May 28, 1934, entitled "Amplifier circuits". The amplifier circuit is utilized to amplify the potential variations described above.

In a particular actual embodiment of the invention it was found that tube 17 could be a type 53 or a type 79 tube while tube 36 could be a type 56 or a type 2A3 tube. In this actual circuit arrangement, the resistors 11 and 12 were, respectively, five megohms, and two megohms while resistor 13 had a value of 0.1 megohm. Condensers 14 and 15 each had a value of 0.1 Mfd. and the values of resistors 29 and 30 were, respectively, two megohms and 0.15 megohm, while the values of resistors 32, and 33 were two megohms each and resistor 34 one megohm. It was found that condensers 31 and 35 could be given the values 0.1 Mfd. for excellent results.

While there have been disclosed only two modifications of the invention it is to be distinctly understood that the principles underlying the invention may be carried out in many other forms without departing from the spirit of the invention and no limitations upon the invention are intended other than those imposed by the scope of the appended claim.

What I claim is:

In a capacity operated relay or power device, a source of alternating current energy, a capacity divider connected across the source, said divider comprising a pair of condensers, a thermionic amplifier including a space discharge device provided with an anode, a cathode and a grid electrode, means connecting the space path of said device to the source to thereby impress an alternating current potential upon the anode of the device, means for connecting the grid electrode of the space discharge device to a point of the capacity divider at which the ratio of the alternating current potential which is thereby impressed upon the grid and the alternating current potential impressed upon the anode is real, a path including resistance means connected between the anode and cathode of the discharge device, and means comprising a connection between the grid electrode and a point of said path for biasing the grid electrode, said condensers being proportioned with respect to each other, and the capacity divider as a whole so that the alternating current potential impressed upon the grid is such that the average direct current drawn by the anode has a value which is sufficient to cause the anode to assume a mean direct current potential relative to the cathode by virtue of the drop in the said resistance means, an output circuit for the space discharge device and a utilizing circuit connected to the output circuit.

FRANCIS H. SHEPARD, Jr.